(12) United States Patent
Sfarzo et al.

(10) Patent No.: US 9,541,959 B1
(45) Date of Patent: Jan. 10, 2017

(54) HARVESTING WASTE LIGHT IN A PORTABLE COMPUTING DEVICE

(71) Applicant: Apple Inc., Cupertino, CA (US)

(72) Inventors: Steven J. Sfarzo, Los Gatos, CA (US); Joss N. Giddings, San Francisco, CA (US); Bradley J. Hamel, Redwood City, CA (US); Matthew P. Casebolt, Fremont, CA (US); Christiaan A. Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 14/548,119

(22) Filed: Nov. 19, 2014

Related U.S. Application Data

(60) Provisional application No. 62/057,834, filed on Sep. 30, 2014.

(51) Int. Cl.
*G06F 1/16* (2006.01)
*F21V 8/00* (2006.01)
*G02F 1/1333* (2006.01)

(52) U.S. Cl.
CPC .......... *G06F 1/1656* (2013.01); *G02B 6/0031* (2013.01); *G02B 6/0073* (2013.01); *G02B 6/0076* (2013.01); *G02F 1/133308* (2013.01)

(58) Field of Classification Search
CPC ... G06F 1/1656; G02B 6/0031; G02B 6/0073; G02B 6/0076; G02F 1/133308
See application file for complete search history.

(56) References Cited

U.S. PATENT DOCUMENTS

| | | | |
|---|---|---|---|
| 2008/0055828 A1* | 3/2008 | Yang | G06F 1/1616 361/679.09 |
| 2013/0328741 A1* | 12/2013 | Degner | G06F 1/1658 343/841 |
| 2015/0009448 A1* | 1/2015 | Cheng | G06F 1/1656 349/58 |

* cited by examiner

*Primary Examiner* — Mary Ellen Bowman
(74) *Attorney, Agent, or Firm* — Zachary D. Hadd

(57) ABSTRACT

An electronic device is disclosed that redirects light escaping from a display assembly light source to an illuminable region of the electronic device. In some embodiments, the electronic device includes a light guide panel arranged along a rear surface of the display assembly and configured to receive light escaping from a lateral side of the light source. The light guide panel can then be arranged to transport that light to a position behind the illuminable region and emit it back out in a focused beam having a size about the same as the illuminable region. In some embodiments the illuminable region can be a logo or device identifier.

20 Claims, 8 Drawing Sheets

HARVESTING WASTE LIGHT IN A PORTABLE COMPUTING DEVICE

CROSS REFERENCE TO RELATED APPLICATIONS

This application claims the benefit of U.S. Provisional Patent Application No. 62/057,834, filed Sep. 30, 2014, and entitled "HARVESTING WASTE LIGHT IN A PORTABLE COMPUTING DEVICE", which is hereby incorporated by reference in its entirety for all purposes.

FIELD

The described embodiments relates to methods for harvesting waste light to help illuminate other components of a portable computing device. More particularly, methods and apparatus for utilizing stray light emitted by a light bar of a display assembly to light up a logo of a portable computing device are disclosed.

BACKGROUND

As electronic devices achieve progressively smaller form factors, increasing an efficiency of the electronic devices becomes increasingly important to increase or at least maintain an amount of time the electronic device can function without recharging. While an illuminable logo can provide a cosmetically-pleasing mark on a product it can also require an increased amount of power to be output by the electronic device to illuminate the illuminable logo. Furthermore, when the illuminable logo is driven by siphoning light away from a display assembly, it can be difficult to control or vary the light source. In most cases, borrowing light from the display assembly also has the disadvantage of reducing a maximum brightness achievable by the display assembly as not all the light that would generally illuminate the display is being utilized.

SUMMARY

This paper describes various embodiments that relate to methods and apparatus for harvesting waste light from a display assembly to illuminate a logo during operation of the display assembly.

A display assembly for a portable computing device is disclosed. The display assembly includes at least the following: a display panel; a first light guide panel disposed behind the display panel and configured to spread light received across and through the display panel; a second light guide panel disposed behind the first light guide panel and configured to redirect light received by it in at least one focused beam of light away from the display panel and towards an illuminable region of a lid of the portable computing device; a reflector positioned between the first light guide panel and the second light guide panel; and a light source configured to direct light towards the first light guide panel.

An electronic device is disclosed. The electronic device includes at least the following: a base; a lid pivotally coupled to the base, the lid defining a display opening oriented in a first direction and an illumination opening oriented in a second direction opposite the first direction; and a display assembly disposed within the lid and aligned with the display opening. The display assembly includes at least the following: a display panel, a light source, a first light guide panel positioned behind the display and configured to spread light received from the light source across the display panel and out of the display opening, and a second light guide panel configured to redirect waste light received from the light source to the illumination opening defined by the lid.

A portable computing device is disclosed. The portable computing device includes at least the following: a base; a lid pivotally coupled to the base, the lid defining an opening covered by a translucent substrate to form an illuminable region; and a display assembly disposed within the lid. The display assembly includes at least the following: a display panel; a light source configured to illuminate the display panel; a reflector including a first surface configured to redirect light from the light source towards the display panel; and a light guide panel coupled to a second surface of the reflector, the second surface opposite the first surface. The light guide panel is configured to redirect waste light from the light source to the illuminable region of the lid.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
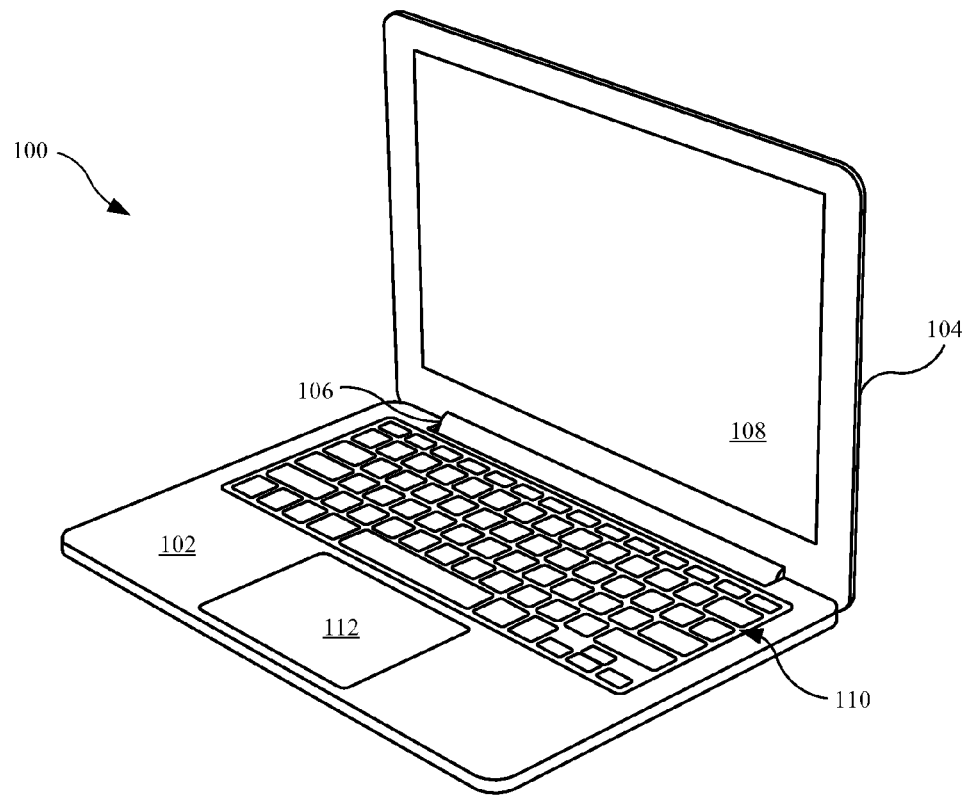
FIG. 1A shows an exemplary electronic device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Generating illumination for a portable computing device can take a substantial amount of power, particularly when the illumination is continuously provided over a long period of time. Illuminated features of a portable computing device often requires continuous illumination. For example, illuminated keyboard keys and illuminated logos are both generally driven by continuous illumination sources and can unfortunately cause substantial battery drain on the portable computing device. One solution to this problem is to redirect light that is unutilized or underutilized to provide illumination for an illuminated feature or features. In some embodiments, redirection of the light can be accomplished by light guide panels. In some embodiments, the unutilized light can be light emitted by light emitting diodes (LEDs) of a light bar. For example, oftentimes only a central portion of light emitted by each of the LEDs of a light bar can be captured by a light guide associated with the display assembly. Consequently, any additional light that can be gathered and redirected comes free of additional energy cost. A second light guide panel can be arranged to collect at least a portion of the light scattered by the LEDs of the light bar and redirect it towards an illuminated feature along the lines of an illuminated logo. In this way, the illuminable logo can be illuminated without decreasing an operating efficiency of the display assembly. This avoids having to use embodiments that involve redirecting portions of the illumination provided by the light bar that would otherwise be used to illuminate the display assembly or expending additional energy from a power source of the portable computing device on discrete lights for the illuminable logo. It should be noted that because the illuminable logo has its own discrete light path in this configuration the light path can include a shutter system or other mechanism for varying light output to the illuminable logo.

These and other embodiments are discussed below with reference to FIGS. 1A-5; however, those skilled in the art will readily appreciate that the detailed description given herein with respect to these figures is for explanatory purposes only and should not be construed as limiting.

Figure 1B:
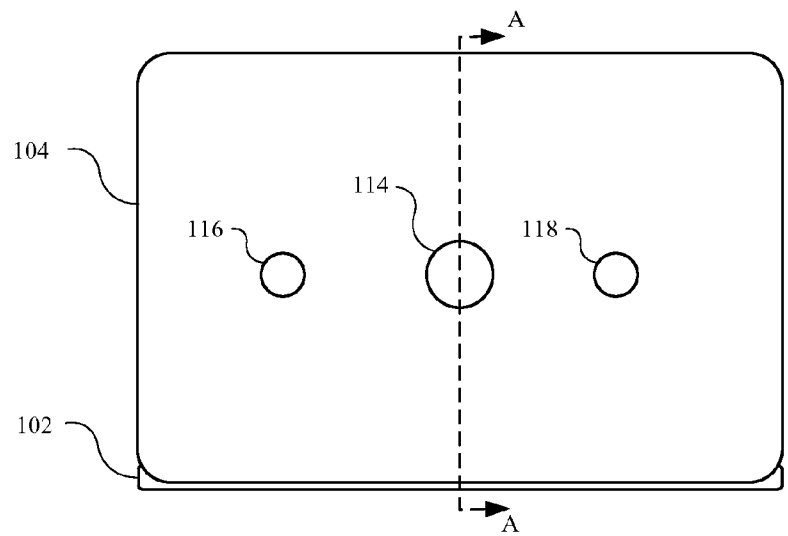
FIG. 1B shows a rear view of an exterior of the electronic device depicted in FIG. 1A.

FIG. 1A shows an exemplary electronic device 100 suitable for use with the described embodiments. In some embodiments, electronic device 100 can be a portable computing device along the lines of a laptop computer. Electronic device 100 includes one housing component that takes the form of base 102 pivotally coupled to lid 104 by hinge assembly 106. Lid 104 can include a number of electrical components that include at least circuitry for supporting display assembly 108. In some embodiments, lid 104 can also include internal antennas for sending and receiving wireless signals. Base 102 can include a number of user interface components such as keyboard 110 and track pad 112 with which a user can interact with electronic device 100. In some embodiments, individual keys of keyboard 110 can be illuminated to assist a user in locating specific ones of the keys in reduced light environments. FIG. 1B shows a rear view of electronic device 100. In particular, a rear surface of lid 104 is shown. The rear surface of lid 104 shows a number of illuminable regions 114, 116 and 118; however, it should be noted that lid 104 can include any number and arrangement of illuminable regions. Illuminable region 114 can be formed by a transparent window that allows light within lid 104 to escape. In some embodiments, the transparent window can be a layer of glass or plastic that covers an opening defined by lid 104. In some embodiments, stray light originally generated to illuminate display assembly 108 can be retrieved by a light guide panel and transmitted out of lid 104 through at least one of illuminable regions 114, 116 and 118. In some embodiments, illuminable region 114 can take the form of a logo or symbol indicative of an origin or model of electronic device 100.

Figure 2A:
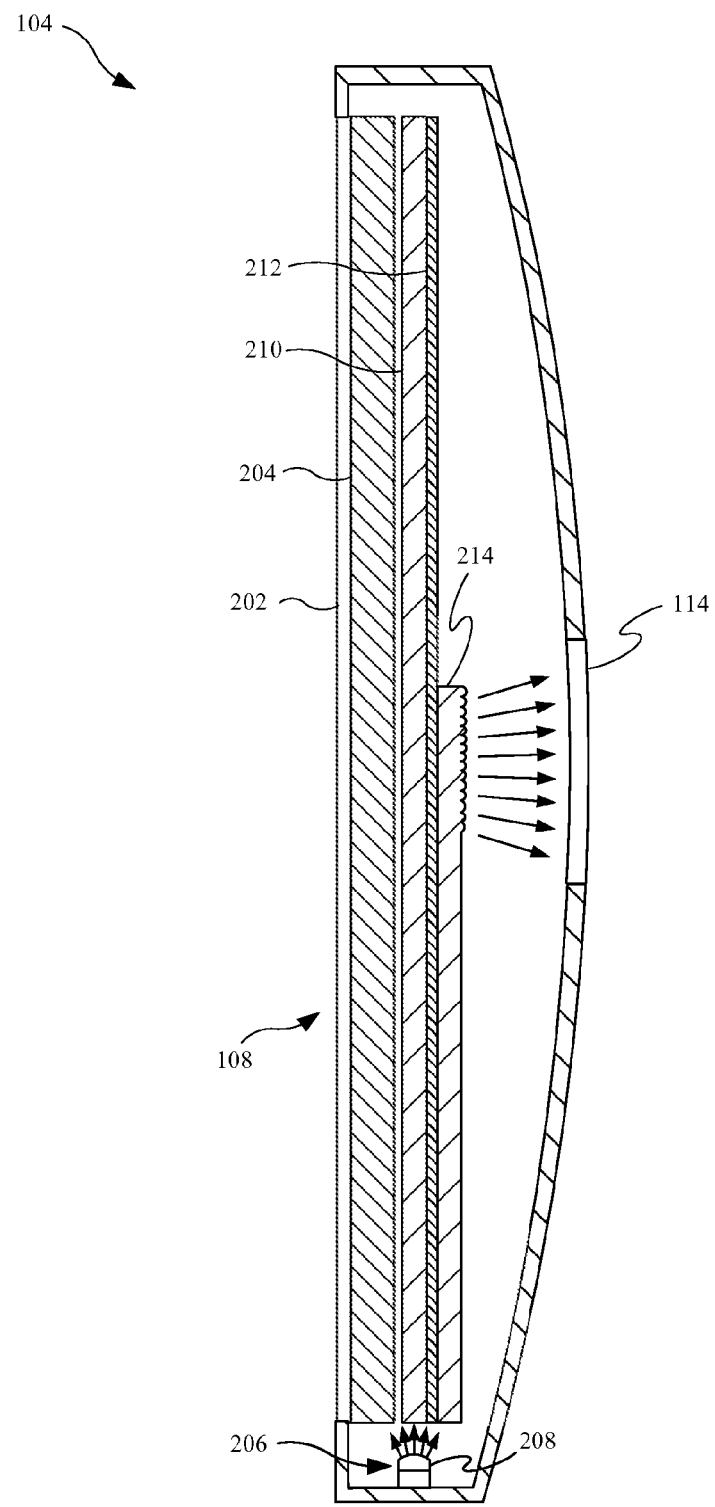
FIG. 2A shows a cross-sectional side view of a lid and a display assembly of the electronic device.

FIG. 2A shows a cross-sectional side view of lid 104 in accordance with section line A-A of FIG. 1B. Lid 104 includes display assembly 108, which includes a number of discrete components. Protective cover 202 covers an opening defined by lid 104. Protective cover is a transparent substrate that can be formed from any number of materials including but not limited to plastic and glass. Display panel 204 can be positioned directly behind protective cover 202. In some embodiments, display panel 204 can be laminated to protective cover 202. Display panel 204 can be a rear illuminated liquid crystal display (LCD). Display panel 204 can be illuminated by a light source that takes the form of light bar 206, which includes a number of light emitting diodes (LEDs) 208. Light guide panel 210 is configured to evenly distribute the light emitted from light bar 206 behind display panel 204. Reflector 212 has a first side that is configured to redirect any light not pointed towards display 104 back towards display panel 204 and out protective cover 202. In some embodiments, reflector 212 can be a silver coated sheet. Lid 104 also includes light guide panel 214, which is positioned against a second side of reflector 212. Light guide panel 214 is positioned to receive a portion of the light from light bar 206 that is scattered to one side of light guide panel 210. Because this light wouldn't normally enter light guide panel 210 there is no extra power cost for redirecting the light in this manner. The light entering light guide panel 214 is then redirected towards illuminable region 114 where it gets redirected out illuminable region 114 in a beam that is about the same size as illuminable region 114. The beam can be formed by adding a matrix of dots or small protrusions oriented towards the illuminable region that allow light trapped in the light guide panel to exit the light guide panel towards illuminable region 114. Reflector 212 can be helpful in redirecting scattered light from light guide panel 214 back towards illuminable region 114.

Figure 2B:
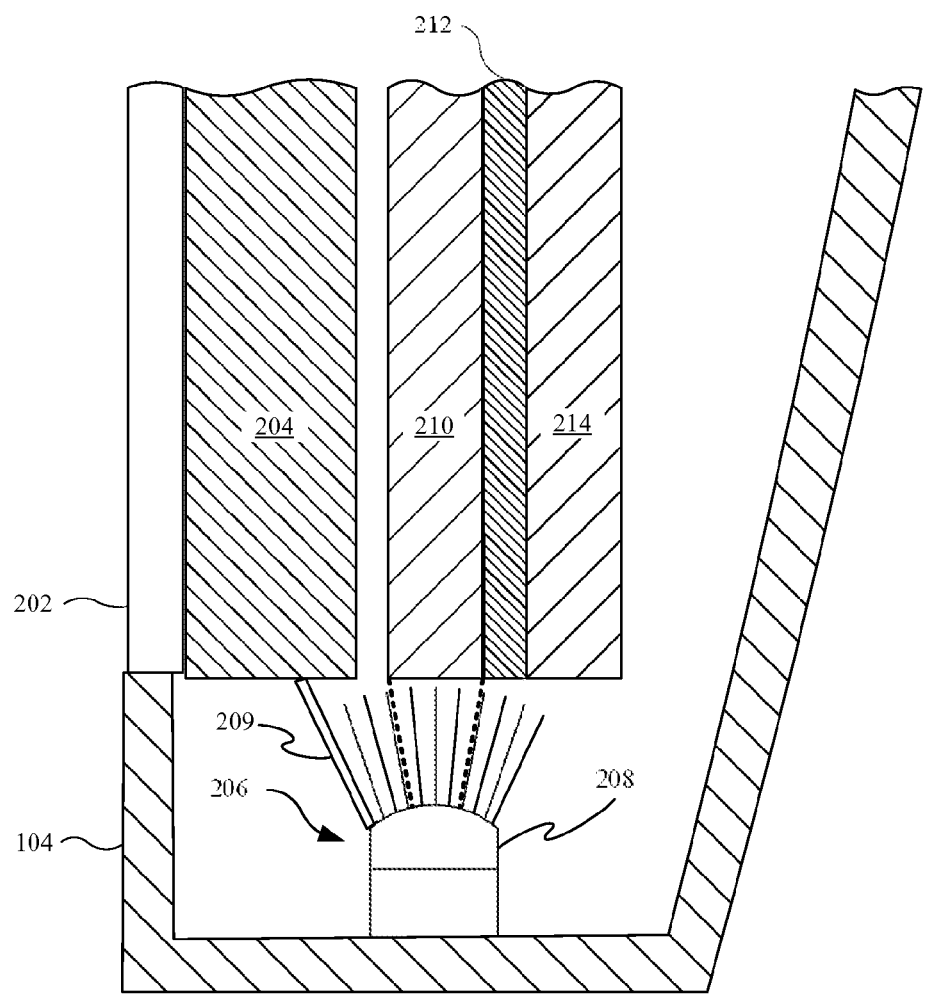
FIG. 2B shows a bottom portion of the lid that includes a close up view showing a light emitting diode (LED) emitting a light pattern that is not all utilized to illuminate the display assembly.

FIG. 2B shows a bottom portion of lid 104 that includes a close up view of how LED 208 emits a light pattern that extends outside of an area in which light guide panel 210 can absorb the light emitted from LED 208. Dotted lines define a central region of the light emitted from LED 208. This central region of light is directly incident to light guide panel 210 and is generally absorbed and evenly distributed behind display panel 204. If not for an additional light guide panel light in a peripheral region outside the central region generally bounces around other portions of lid 104. In some cases, a small amount of light from the peripheral region is reflected back into light guide panel 210. Light guide panel 214 is configured to receive a small portion of light from the peripheral region directed towards a rear portion of lid 104. Most of the light that shines directly upon a bottom edge of light guide panel 214 can be transported with minimal light loss up to an illuminable region (not depicted) of lid 104. In some embodiments, an amount of waste light delivered to light guide panel 214 can be regulated by adjusting a size of the beam emitted from LED 208. The beam size can be adjusted in a number of ways including for example, choosing an LED 208 with a narrower beam pattern or shrouding the peripheral portion of LED 208 with reflector 209 to reflect a portion of the light from the peripheral region back towards light guide panel 210. In some embodiments, only a portion of the peripheral region oriented away from light guide panel 214 is shrouded so that an amount of light redirected towards one of the illuminable regions remains undiminished.

Figure 2C:
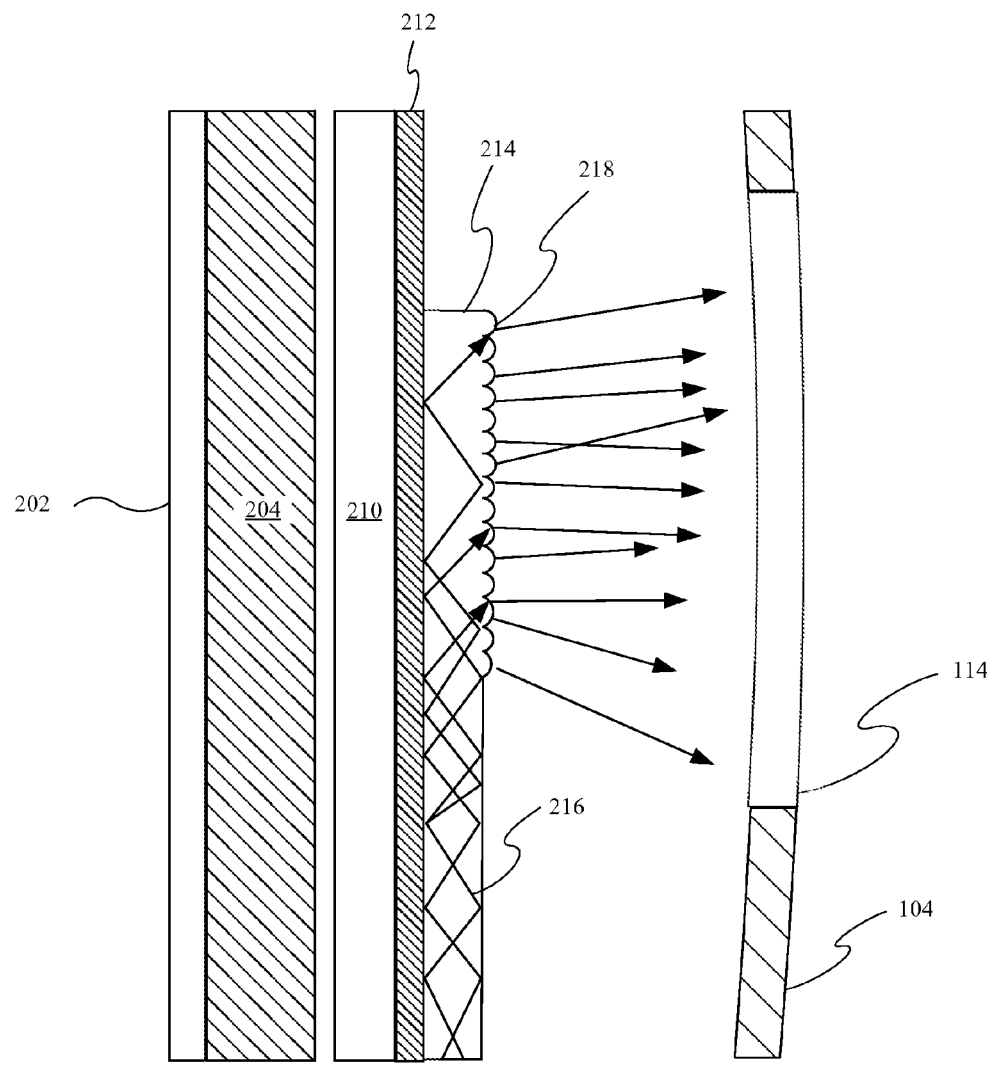
FIG. 2C shows an illuminable region of the lid and how a light guide panel can direct stray light received from the display assembly light source to illuminate the illuminable region.

FIG. 2C shows a central portion of lid 104 just behind illuminable region 114 and how light guide panel 214 can be configured to direct light received from LEDs 208 and release that light towards illuminable region 114. Light introduced into light guide panel 214 can bounce around within light guide panel 214 following one of paths 216 until the path the light is following strikes a bump 218. One of bumps 218 can allow light that hits it to escape light guide panel 214 in a direction in which bump 218 is oriented. Light guide panel 214 can include a number of bumps 218 to release the light received from LEDs 208 at illuminable region 114. In some embodiments, bumps 218 can be arranged in a matrix having a shape and size about the same as illuminable region 114. In some embodiments, illuminable region 114 can be made from a translucent material that diffuses the light received from light guide panel 214 so that the light is evenly spread across illuminable region 114. It should be noted that reflector 212 helps prevent light trapped within light guide panel 214 from exiting light guide panel 214 away from illuminable region 114 on account of it reflecting any light escaping in such a way back towards illuminable region 114. It should also be noted that while not depicted, light guide panel 210 also includes bumps oriented towards display panel 204 that allow light to be evenly released towards display panel 204.

Figure 3A:
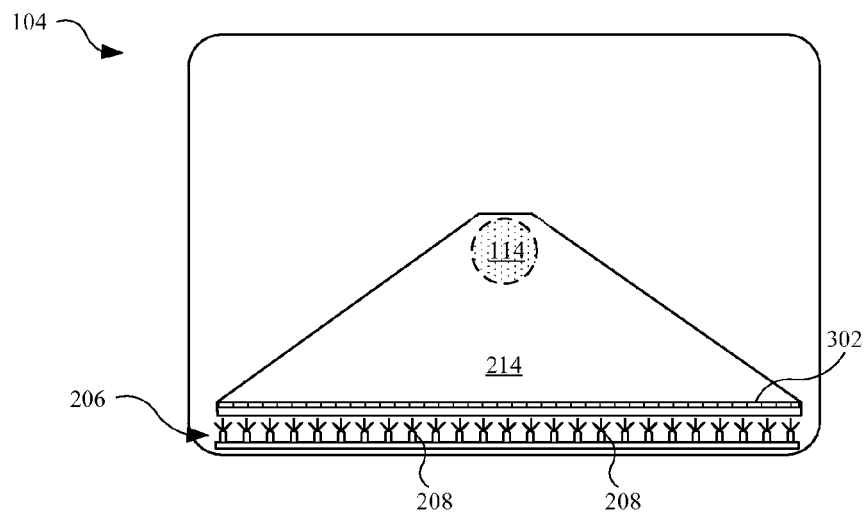
FIG. 3A shows a rear cross-sectional view of the lid.

FIG. 3A shows a rear cross-sectional view of lid 104. FIG. 3A depicts light bar 206 and individual LEDs 208 disposed along a bottom edge of lid 104. Light guide panel 214 is also depicted which is shown having a tapered geometry for directing light collected from all of LEDs 208 towards centrally positioned illuminable region 114. In some embodiments, light guide panel 214 can also include a shutter system 302 for modulating an amount of light provided to illuminable region 114. For example, shutter system 302 can be configured to pulse light directed towards illuminable region 114 as a form of a notification. Shutter system 302 can take many embodiments. In some embodiments, shutter system 302 can be a mechanical shutter positioned between light bar 206 and light guide panel 214. In some embodiments, shutter system 302 can be electrically driven. For example, light guide panel 214 can include integrated shutter system 302 embodied as a narrow LCD display integrated across a bottom edge of light guide panel 214. In this way shutter system 302 can prevent light from light bar 206 from entering light guide panel 214 when voltage is applied across shutter system 302. In another embodiment the narrow LCD can be configured to change a color of the light transmitted into light guide panel 214. In some embodiments, modulation of light transmitted to illuminable region 114 can be controlled by a processor disposed within base 102.

Figure 3B:
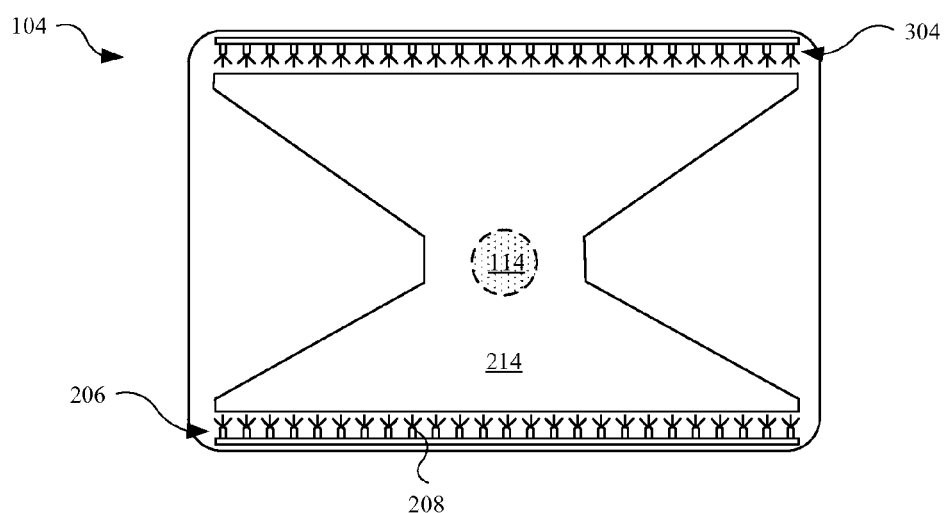
FIG. 3B shows a rear cross-sectional view of the lid with a two light bar configuration.
Figure 3C:
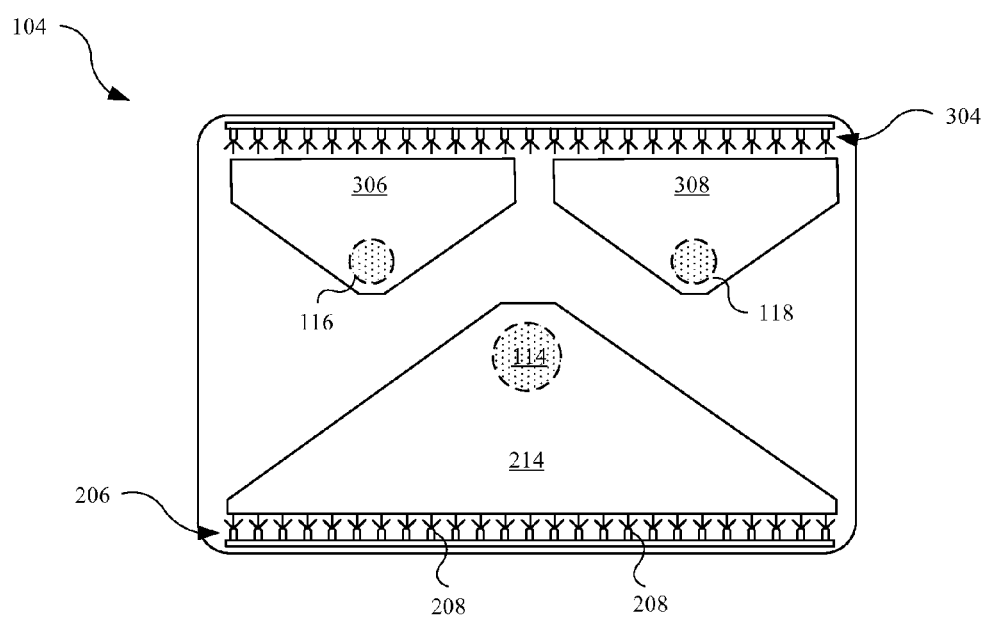
FIG. 3C shows a rear cross-sectional view of the lid in an embodiment where the lid includes multiple illuminable regions.

FIG. 3B shows a rear cross-sectional view of lid 104, in which lid 104 includes multiple light bars. In particular, FIG. 3B shows another light bar 304 disposed along a top edge of lid 104. This configuration can be appropriate in situations where display panel 204 (not shown) is configured to receive light from above and below. In some embodiments, this type of configuration can increase an amount of light provided across display assembly 108 and make a distribution of the light more even than would be possible with a display panel only supported by a single light bar. In this embodiment, light guide panel 214 can be configured to collect waste light from both light bar 206 and light bar 304. Light from both light bars gets channeled towards illuminable region 114. It should be noted that in some embodiments, light emitted by different light bars can be directed towards different illuminable regions. For example, FIG. 3C shows a configuration in which light guides 306 and 308 are configured to direct light from light bar 304 towards illuminable regions 116 and 118 respectively. In some embodiments, each of the light guides can include a shutter system so that illuminable regions 114, 116 and 118 can be illuminated in different patterns and different colors. It should be noted that in some embodiments a single light guide panel could be configured to direct light to multiple illuminable regions.

Figure 4:
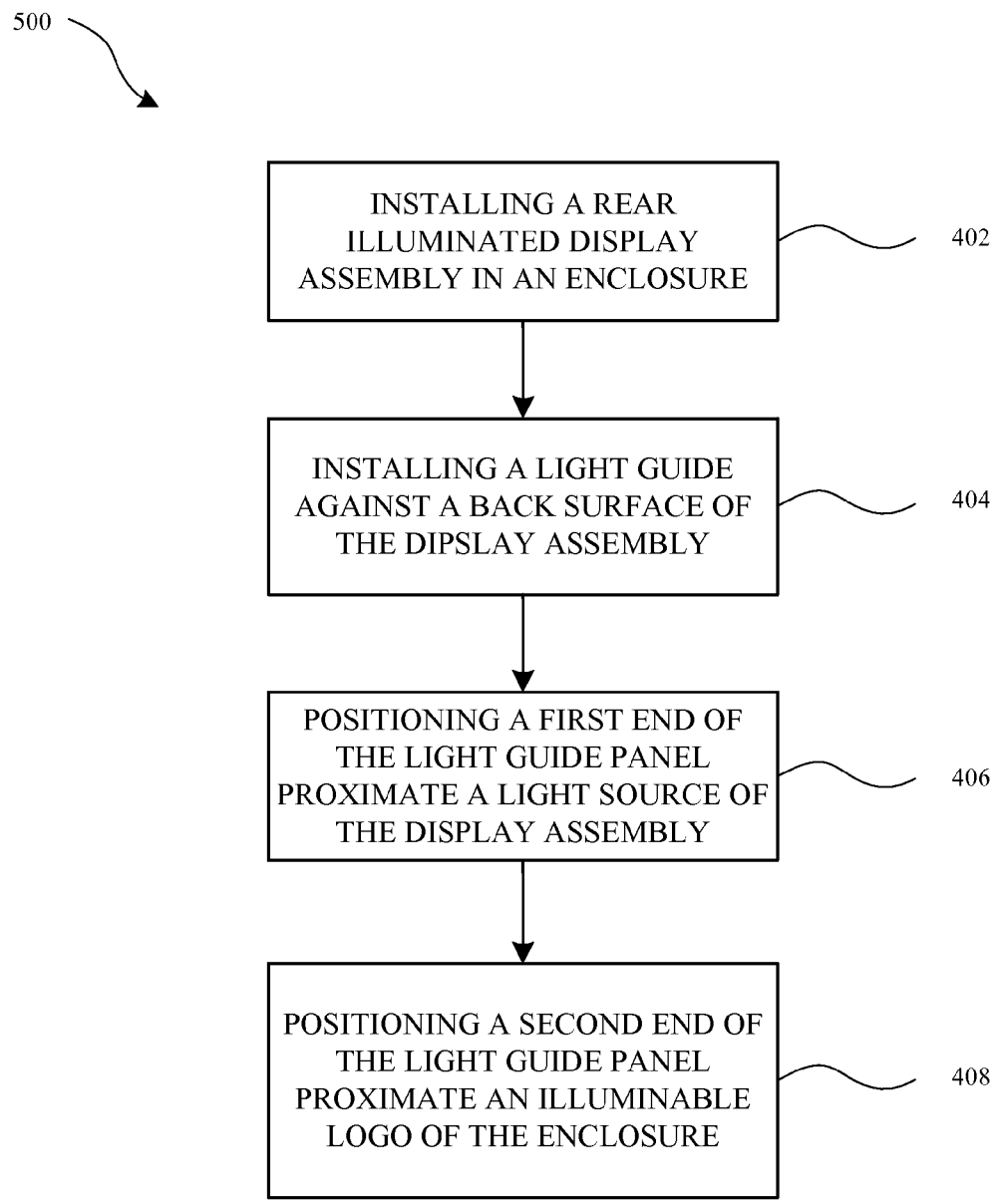
FIG. 4 shows a flow chart representing a method for assembling a system that harvests waste light from the display assembly.

FIG. 4 shows a flow chart representing a method 400 for harvesting waste light from a display assembly. At a first step 402, a rear illuminated display assembly is positioned within an enclosure of a portable computing device. The rear illuminated display can include a display panel and a first light guide panel for spreading light across a rear-facing side of the display panel that is provided by a light source of the display assembly. The display assembly can also include a reflector for redirecting stray light from the light guide panel back towards the display panel. At step 404, a second light guide panel is installed against a rear surface of the display assembly. In some embodiments, the second light guide panel can be adhesively coupled to the display assembly. In some embodiments, the second light guide panel can be fastened to the rear surface of the display assembly. At step 406, a first end of the second light guide panel is positioned proximate the light source of the display assembly. The first end of the second light guide panel can be oriented towards the light source to maximize an amount of waste light harvested by the second light guide panel, since light guide panels are generally configured to receive light at their ends. At step 408, a second end of the light guide panel is positioned proximate an illuminable logo of the enclosure. The second end of the light guide panel can be configured with a number or a matrix of bumps configured to direct the light out of the second light guide panel in a controlled beam towards an illuminable region of the enclosure.

Figure 5:
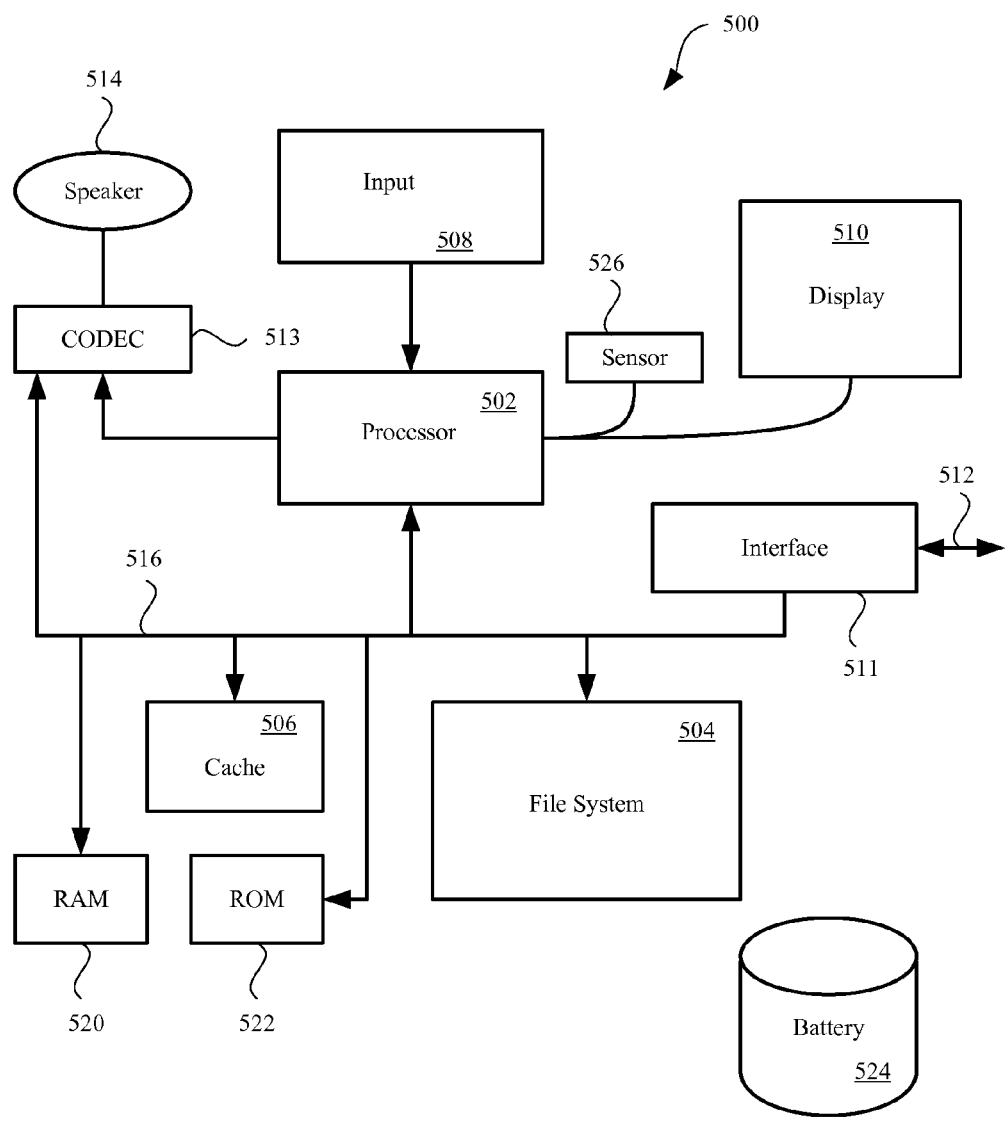
FIG. 5 shows a block diagram of an electronic device suitable for use with the described embodiments.

FIG. 5 is a block diagram of electronic device 500 describing components suitable for controlling an amount of light delivered to illuminable region of a portable computing device. Electronic device 500 illustrates circuitry of the portable computing device. Electronic device 500 includes a processor 502 that pertains to a microprocessor or controller for controlling the overall operation of electronic device 500. Electronic device 500 contains instruction data pertaining to operating instructions in a file system 504 and a cache 506. The file system 504 is, typically, a storage disk or a plurality of disks. The file system 504 typically provides high capacity storage capability for the electronic device 500. However, since the access time to the file system 504 is relatively slow, the electronic device 500 can also include a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504. Further, the file system 504, when active, consumes more power than does the cache 506. The power consumption is often a concern when the electronic device 500 is a portable device that is powered by a battery 524. The electronic device 500 can also include a RAM 520 and a Read-Only Memory (ROM) 522. The ROM 522 can store programs, utilities or processes to be executed in a non-volatile manner. The RAM 520 provides volatile data storage, such as for cache 506.

The electronic device 500 also includes a user input device 508 that allows a user of the electronic device 500 to interact with the electronic device 500. For example, the user input device 508 can take a variety of forms, such as a button, keypad, dial, touch screen, audio input interface, visual/image capture input interface, input in the form of sensor data, etc. Still further, the electronic device 500 includes a display 510 (screen display) that can be controlled by the processor 502 to display information to the user. A data bus 516 can facilitate data transfer between at least the file system 504, the cache 506, the processor 502, and a CODEC 513. The CODEC 513 can be used to decode and play a plurality of media items from file system 504 that can correspond to certain activities taking place during a particular manufacturing process. The processor 502, upon a certain operating event or events occurring, supplies the media data (e.g., audio file) for the particular media item to a coder/decoder (CODEC) 513. The CODEC 513 then produces analog output signals for a speaker 514. The speaker 514 can be a speaker internal to the electronic device 500 or external to the electronic device 500. For example, headphones or earphones that connect to the electronic device 500 would be considered an external speaker.

The electronic device 500 also includes a network/bus interface 511 that couples to a data link 512. The data link 512 allows the electronic device 500 to couple to a host computer or to accessory devices. The data link 512 can be provided over a wired connection or a wireless connection. In the case of a wireless connection, the network/bus interface 511 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 526 can take the form of circuitry for detecting any number of stimuli. For example, sensor 526 can include any number of sensors for monitoring various operating conditions of electronic device 500, such as for example a Hall Effect sensor responsive to external magnetic field, a temperature sensor, an audio sensor, a light sensor such as a photometer, a depth measurement device such as a laser interferometer and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A display assembly for a portable computing device, the display assembly comprising:
    a display panel;
    a light source that emits light;
    a first light guide panel disposed behind the display panel and configured to receive a first portion of the light from the light source and direct the first portion of the light through the display panel;
    a second light guide panel disposed behind the first light guide panel and configured to receive a second portion of the light from the light source that is not received by the first light guide panel and redirect the second portion of the light in at least one focused beam away from the display panel and towards an illuminable region of a lid of the portable computing device; and
    a reflector positioned between the first light guide panel and the second light guide panel.

2. The display assembly as recited in claim 1, wherein the second portion of the light is a peripheral portion of the light emitted by the light source that is received by the second light guide panel.

3. The display assembly as recited in claim 1, wherein the light source comprises a first light bar positioned at a first end of the display assembly.

4. The display assembly as recited in claim 3, further comprising a second light bar positioned at a second end of the display assembly, the second end opposite the first end.

5. The display assembly as recited in claim 1, wherein the first light guide panel receives more of the light than the second light guide panel.

6. The display assembly as recited in claim 1, wherein the second light guide panel includes a shutter system for varying the second portion of the light from the light source.

7. The display assembly as recited in claim 6, wherein the shutter system comprises an electrically actuated shutter embedded in one end of the second light guide panel.

8. The display assembly as recited in claim 7, wherein the electrically actuated shutter is configured to pulse the second portion of the light arriving at the illuminable region.

9. The display assembly as recited in claim 1, wherein the display assembly includes a reflector disposed proximate the light source to redirect the second portion of the light towards the second light guide panel.

10. The display assembly as recited in claim 1, wherein the second light guide panel is configured to direct the second portion of the light to a plurality of illuminable regions.

11. An electronic device, comprising:
    a base;
    a lid pivotally coupled to the base, the lid defining a display opening oriented in a first direction and an illumination opening oriented in a second direction opposite the first direction; and a display assembly disposed within the lid and aligned with the display opening, the display assembly comprising:
    a display panel,
    a light source,
    a first light guide panel positioned behind the display and configured to spread light received from the light source across the display panel and out of the display opening, and
    a second light guide panel configured to redirect waste light received from the light source to the illumination opening defined by the lid.

12. The electronic device as recited in claim 11, further comprising an optically transparent substrate covering the illumination opening to form an illuminable region.

13. The electronic device as recited in claim 12, wherein the light source is directed towards one end of the first light guide panel.

14. The electronic device as recited in claim 13, wherein the light source is a first light source positioned along a first end of the lid and wherein the display assembly further comprises a second light source positioned along a second end of the lid, the second end opposite the first end.

15. The electronic device as recited in claim 14, wherein the second light guide panel receives light from both the first light source and the second light source that the second light guide panel directs towards the illuminable region.

16. A portable computing device, comprising:
    a base;
    a lid pivotally coupled to the base, the lid defining an opening covered by a translucent substrate to form an illuminable region; and
    a display assembly disposed within the lid, the display assembly comprising:
        a display panel,
        a light source configured to illuminate the display panel,
        a reflector comprising a first surface configured to redirect light from the light source towards the display panel, and
        a light guide panel coupled to a second surface of the reflector, the second surface opposite the first surface, the light guide panel being configured to redirect waste light from the light source to the illuminable region of the lid.

17. The portable computing device as recited in claim 16, wherein the second surface of the reflector redirects light emitted by the light guide panel towards the illuminable region.

18. The portable computing device as recited in claim 16, wherein a first end of the light guide panel is proximate the light source and a second end of the light guide panel is proximate the illuminable region.

19. The portable computing device as recited in claim 18, wherein the light guide panel is configured to modulate an amount of light received from the light source.

20. The portable computing device as recited in claim 19, further comprising a processor in communication with the light guide panel and configured to vary an amount of light received from the light source to provide a signal to a user of the portable computing device.

* * * * *